US009764521B2

(12) United States Patent
Hansen

(10) Patent No.: US 9,764,521 B2
(45) Date of Patent: Sep. 19, 2017

(54) SHOE PART SHAPING INSERT TO BE PLACED IN A MOLD

(71) Applicant: ECCO SKO A/S, Bredebro (DK)

(72) Inventor: Hans Christian Hansen, Løgumkloster (DK)

(73) Assignee: ECCO SKO A/S, Bredebro (DK)

( * ) Notice: Subject to any disclaimer, the term of this patent is extended or adjusted under 35 U.S.C. 154(b) by 338 days.

(21) Appl. No.: 14/417,280

(22) PCT Filed: Aug. 6, 2013

(86) PCT No.: PCT/DK2013/050259
§ 371 (c)(1),
(2) Date: Jan. 26, 2015

(87) PCT Pub. No.: WO2014/032673
PCT Pub. Date: Mar. 6, 2014

(65) Prior Publication Data
US 2015/0210028 A1 Jul. 30, 2015

(30) Foreign Application Priority Data
Aug. 28, 2012 (DK) .................................. 2012 70509

(51) Int. Cl.
B29C 45/26 (2006.01)
B29D 35/00 (2010.01)
(Continued)

(52) U.S. Cl.
CPC ........ B29D 35/0018 (2013.01); A43B 1/0027 (2013.01); A43B 13/12 (2013.01);
(Continued)

(58) Field of Classification Search
None
See application file for complete search history.

(56) References Cited

U.S. PATENT DOCUMENTS 4,217,081 A * 8/1980 Rooney ................ B29D 35/122
249/83
5,193,240 A * 3/1993 Salpietro .............. A43B 1/0072
12/142 RS
(Continued)

FOREIGN PATENT DOCUMENTS

DE 2454731 * 5/1976
DE 2721443 A1 11/1979
(Continued)

Primary Examiner — Edmund Lee
(74) Attorney, Agent, or Firm — Cantor Colburn LLP

(57) ABSTRACT

The invention relates to a method for manufacturing a shoe part by injection molding a material into a mold where an insert is placed. The insert comprises at least two separable insert parts, an upper insert part and a lower insert part, providing an injection channel in the region of the separation area between the two parts. The insert is placed in the chamber and the injection material is injected through a sprue channel in the mold into the injection channel and into a cavity, whereby the shoe part is formed. The mold is opened after the injection material has cured and the insert is separated into the upper and lower insert parts, thereby exposing the cured material in the injection channel.

8 Claims, 7 Drawing Sheets

(51) Int. Cl.
- *A43B 1/00* (2006.01)
- *A43B 13/12* (2006.01)
- *A43B 23/17* (2006.01)
- *B29D 35/08* (2010.01)
- *B29D 35/14* (2010.01)

(52) U.S. Cl.
CPC ............ *A43B 23/17* (2013.01); *B29C 45/26* (2013.01); *B29C 45/2673* (2013.01); *B29C 45/2675* (2013.01); *B29D 35/0027* (2013.01); *B29D 35/081* (2013.01); *B29D 35/142* (2013.01)

(56) References Cited

U.S. PATENT DOCUMENTS

| | | |
|---|---|---|
| 6,149,852 A | 11/2000 | Romanato et al. |
| 2004/0032042 A1 | 2/2004 | Chi |

FOREIGN PATENT DOCUMENTS

| | | | |
|---|---|---|---|
| DE | 9002131.2 U1 | | 6/1990 |
| DE | 4006818 | * | 9/1991 |
| WO | 2011054509 A1 | | 5/2011 |

* cited by examiner

SHOE PART SHAPING INSERT TO BE PLACED IN A MOLD

This is a National Phase Application filed under 35 U.S.C. 371 as a national stage of PCT/DK2013/050259, filed Aug. 6, 2013, claiming priority from Denmark Application No. PA 2012 70509, filed Aug. 28, 2012, the content of each of which is hereby incorporated by reference in its entirety.

TECHNICAL FIELD

The invention relates to a method for manufacturing one or more shoe parts by injection moulding of a material onto a shoe upper mounted on a last and injecting said material into a mould comprising a vertically moveable bottom piston and side frames, said mould providing a chamber for injection moulding the shoe part(s) and for placing a shoe part shaping insert in said mould. The invention also relates to a shoe-part shaping insert.

BACKGROUND

WO 2011/054509 describes a method for manufacturing a multi-density shoe sole comprising repeated injections of sole material onto a shoe upper mounted on a last and placed in a mould. The method includes an insert placed in the mould prior to a first injection takes place through a sprue channel placed in the mould. After the first injected material has cured, the insert is removed and a second injection takes place through a second sprue channel placed in the mould. A drawback of this solution is that it always requires two injection channels placed in the mould, which makes the mould complicated and more expensive compared to a mould provided with only one channel. Furthermore, the method and the insert are not suitable for producing sole parts placed at the under-surface of the outsole and are not suitable for producing several shoe parts. Further, the method will induce a melt scar in a heel cap when the method is used for producing such a shoe part, due to the injection channel placed in the mould and the outlet corresponding to the visible back surface of the heel cap.

Therefore, it is an object of the invention to provide a method and an insert overcoming at least some of the disadvantages of the prior art or providing at least a useful alternative.

DISCLOSURE OF THE INVENTION

According to a first aspect of the invention, a method as described in the introduction is provided, said method comprising that the insert comprises at least two separable insert parts, an upper insert part and a lower insert part, said upper and lower insert parts being an assembled unit during the injection of the injection material and at least one injection channel being provided in the region of the separation area between the at least two parts, said insert being placed in the chamber and the injection material being injected through a sprue channel in the mould into the injection channel(s) and into a cavity, whereby the shoe part is formed, said mould is opened after the injection material has cured and the insert is separated into the at least upper and lower insert parts, thereby exposing the cured material in the injection channel(s).

The insert is placed inside the outer perimeter of the bottom piston. The lasted upper is lowered into a position for injection of a material for making the sole parts and the sole. The bottom piston is then moved up and the side frames are moved towards each other, whereby the mould is closed. An injection chamber is now defined as an open space delimited by the insert, parts of the mould (side frames and bottom piston) and eventually the lasted upper, depending on which shoe part the method is going to produce. The injection material is injected into a sprue channel placed in the mould, further into an injection channel of the insert and then further into the cavity, whereby the shoe part is moulded. The shoe part could be a heel cap or a toe cap or a part of the sole. The sole is broadly defined as a midsole or/and an outsole.

By a cavity is to understand one or more specific areas, where the injected material arising from one injection channel is forming shoe parts.

The mould is then opened after the material has cured and the insert is removed by opening the insert into two halves, i.e. the upper insert part and the lower insert part. It is now possible to remove the cured material placed in the injection channel.

By this arrangement, the injection channel of the insert has the effect of extending the sprue channel to the pre-defined space. It works as an extension of the sprue channel, whereby the melt can be directed to any cavity defined in the mould. The connection between the sprue channel and the injection channel is fluidtight. As the outlet of the injection channel by this arrangement also is placed inside the mould and on a surface not visible when the shoe is manufactured, there will be no impression scar of the melt inlet as this will be covered by following injections.

The following injection(s) fill in the chamber made after removal of the insert. Several inserts following each other can be placed in the mould. For instance, the first insert may be placed for making a toe cap, i.e. the injection channel will now run through the whole length of the insert towards the tip of the last. The next insert can then be formed in order to form a heel cap. This may be done by simply replacing the upper part of the first insert with a new upper part insert suitably formed for directing the melt towards the heel and in order to manufacture such a heel cap. The next injection and third insert may then be an insert for moulding specific areas of the outsole or midsole. Finally, the last insert is removed from the mould and a final injection takes place forming the sole and binding the different shoe parts together providing the sole. The shoe part shaping inserts act as dummies during the injections and after their removal they leave a specific cavity, which is filled with another material in a later injection step, the material being of another colour or another density, i.e. with other mechanical properties.

With the described arrangements, a multi-density shoe part and shoe sole can be manufactured without the use of differently shaped bottom pistons or different removable moulds. Thus, the invention enables changes in the material composition for a sole without having to produce new mould parts. It is cost efficient and saves times and makes it easy to change the design and provide shoes with new features, whenever wanted.

In a further preferred embodiment of the invention, the insert further comprises at least one side channel being in fluidtight connection with the injection channel), whereby the injected material flows through the sprue channel through the injection channel and further into the side channel(s). Thereby it is possible to distribute the injected material to one or more specific areas and forming shoe parts having properties of the injected material.

In a further preferred embodiment of the invention, the insert is removed and a second insert is placed in the mould, said second insert comprising a second upper insert part and a second lower insert part, said injection channel of the second insert being in fluidtight connection with the sprue channel in the mould. Thereby it is possible to distribute a material different from the first injected material into a new cavity, and by the insert well-defined cavity and forming a shoe-part. The shoe part or parts depending on the number of side channels can be specific areas of the outsole or midsole or it can be parts adhering to the upper of the shoe.

In a further preferred embodiment of the invention, an insert positioned as the last one in the mould is removed, the upper mounted on the last and the moulded shoe part is placed in the mould, the mould is closed, and a new injection of material takes place through the sprue channel in the mould. When the final insert is removed and a cavity is left, the cavity is then filled with a sole material with a suitable colour and with suitable mechanical properties. Thereby the sole is finally formed. The sole comprises an outsole, midsole and eventually a shank. The outsole can be pre-moulded and placed in the mould before the soled shoe is finally manufactured or the outsole can be manufactured during a moulding process and using the mould.

In a further preferred embodiment of the invention, the injected material is led by at least two side channels in fluidtight connection with the injection channel comprising at least two different outlets placed at opposite sides of the injection channel and at an outer side of the insert, said material flowing through the outlet and into a second cavity delimited by the mould, the last and the outer side of the insert, whereby a shaping of the shoe part takes place. By this construction of the insert, the injected material is guided into a cavity from two different sides flowing together to form/forming a shoe part, such as a heel cap or a toe cap. The outlets are placed in such a way that there will be no visible impressions of the melt flow at the moulded and cured shoe part due to the outlets of the melt being placed in an area not visible in the final produced shoe.

The outlets may be placed at the outer surface of the upper insert part, whereby a heel cap or toe cap can be provided. The outlets can also be placed at the lower insert part. This is the case when specific outer sole parts are to be produced.

Off course, the outlets may also guide the material into two or more different areas.

In a further preferred embodiment of the invention, during the injection, the shoe part shaping insert is partitioning the injection chamber into at least a first and a second cavity, where a first shoe part material of a given colour or given density is injected into the first cavity through the injection channel of the insert, and a second shoe part material of another colour or density or other given mechanical properties is injected through the sprue channel of the mould into the second cavity after removal of the shoe sole shaping insert. This is the process step when only one shoe part is to be manufactured before the whole sole as such is moulded. Due to the construction of the insert and the injection channel placed in the insert, the material can be injected into the first cavity no matter where this cavity is placed in the mould.

In a further preferred embodiment of the invention, several inserts are used and during the injections, the shoe part shaping inserts are partitioning the injection chamber into at least a first, a second and a third cavity, where a first shoe part material of a given colour or density or other given mechanical properties is injected into the first cavity through the injection channel of the first insert and after said removal of the first shoe part shaping insert, a second shoe part shaping insert comprising a second injection channel is placed in the mould and a second material of another colour or density or other given mechanical properties is injected through the second channel into the second cavity made by removal of the first shoe part shaping insert, and the third cavity is created by removing the second insert, and a material being injected through the sprue channel of the mould. There may then be used several inserts and even more than three. Every insert directs the injected melt to a certain cavity, where the mechanical properties of the injected material is wanted. It might not be the whole insert that is exchanged after an injection. It could, as mentioned above, just be the upper part that is exchanged, which blocks or open up for new side channels placed in the lower insert part. The third cavity is to be understood as one or more cavities following the first and second cavities and depends on how many further inserts are placed in the mould. The third cavity may be the cavity for forming the rest of the sole.

In a further preferred embodiment of the invention, several insert parts are used during the injection, said insert parts forming the shoe part shaping insert, the shoe part shaping insert partitioning the injection chamber into at least a first, a second and a third cavity, where a first shoe part material of a given colour, density or given mechanical properties is injected into the first cavity through the injection channel placed in one or the other of the insert parts, said injection channel being in fluidtight connection with the sprue channel, and a second material being injected through another sprue channel in fluidtight connection with another injection channel delimited by another insert part and flowing further into the second cavity, whereby different shoe parts are formed, and by removal of the insert parts, the third cavity is created, and a material is injected through one of the sprue channels of the mould.

In this way, an insert comprising several injection paths is created. Each injection channel is in fluidtight connection with a sprue channel placed in the mould. By this arrangement, it is possible to form several shoe parts without opening the mould as the first injection through one injection channel is forming one sort of shoe parts with the mechanical properties of the chosen material. Then the second injection takes place after the first injection has taken place or at the same time, but with another injection material with different mechanical properties and/or another colour.

In a further preferred embodiment of the invention, the shoe part shaping insert acts as distributor for the injected material and transports the injected material from the sprue channel placed in the mould to the outlet(s) of the insert. The channels of the insert transport and direct the injected melt into the cavity, whereon the outlets open.

In a further preferred embodiment of the invention, the method comprises a final injection of a sole material after the shoe parts are moulded, said finally injected material binding to the shoe parts when it has cured. Thereby, the final shoe is formed. The shoe comprises a sole with specific parts, such as a heel cap or a toe cap or specific parts of the sole (comprising specific mechanical or design properties), placed at the upper.

In a further preferred embodiment of the invention, the upper insert part is made in a silicone or rubber material and the lower insert part is made in, glass fibre, aluminium or nylon. This is a suitable material for making the insert. The lower part is made in a hard and wear resistant material. This is convenient as the injection channel is preferable placed in this part. The upper part is made in a more flexible material and secures that a tight interface between the two insert parts takes place.

In a further preferred embodiment of the invention, the lasted upper when placed in the mould, is resting against the shoe part shaping insert.

In a further preferred embodiment of the invention, the shoe part shaping insert is fitted onto the lasted shoe upper prior to the injection.

In a further preferred embodiment of the invention, the shoe part shaping insert has the shape of a heel or a midsole of a shoe, and where the cavity in the injection chamber, when said inserts are placed in the mould, corresponds to a heel cap or an outsole part or a toe cap.

In a further preferred embodiment of the invention, the shoe part shaping insert has one or more injection channels for diverting away injected material and that each channel is in fluidtight connection with a sprue channel in the mould. Thereby it is possible to inject different material into different sprue channels and further into the injection channels of the insert, thereby forming shoe parts with different properties, but without it being necessary to remove the insert between the injections of the melt.

In a further preferred embodiment of the invention, a plurality of independent shoe part shaping inserts is used.

In a further preferred embodiment of the invention, the shoe part shaping insert is provided for forming a heel cap, a toe cap or an outer sole part.

In a preferred embodiment, the injection channel continues into at least one side channel, said injection channel and side channel comprise an injection path.

In a preferred embodiment, the mould comprises several sprue channels, said individual sprue channel being in fluidtight connection with an injection channel, and whereby injected material is led into several cavities. The number of sprue channels depends on the number of injection channels.

The invention also relates to a shoe part shaping insert adapted to be placed in a mould and for shaping a shoe part, characterised in that the insert comprises at least an upper insert part and a lower insert part, said upper part comprising an upper first surface facing a lasted upper and an oppositely placed upper second surface, said upper part further comprising an upper side surface connecting the first and second surfaces of the upper part with each other, and the lower insert part comprising a lower first surface facing the inside of the mould and an oppositely placed lower second surface facing the upper second surface and a lower side surface connecting the lower first and second surfaces, said upper and lower second surfaces encircling at least one injection channel when the two surfaces abut each other and the insert part being adapted to be separated, thereby exposing the injection channel.

In a further preferred embodiment of the invention, the shoe part shaping insert comprises at least one further insert part, said insert part being provided to be placed with a surface facing the upper first surface and an injection channel being provided between the two surfaces, when the two surfaces abut each other.

By this arrangement, the insert comprises more than two insert parts, whereby it is possible to make two injection channels placed differently from each other in a vertical direction and also to form two cavities, where the cavity formed by one insert part is independent of the cavity formed by the other insert part. Thereby, the degree of freedom for forming shoe parts has been significantly increased.

In a further preferred embodiment of the invention, the shoe part shaping insert comprises at least one further insert part, said insert part being provided to be placed with a surface facing the lower first surface and an injection channel being provided between the two surfaces, when the two surfaces abut each other. Thereby, the degree of freedom for forming shoe parts has been even more increased.

In a further preferred embodiment of the invention, the shoe part shaping insert comprises an upper insert part adapted to cooperate with a lower insert part, said upper insert part being further provided with a second lower insert part placed at and integrated with the upper first surface of the upper insert part, said second lower insert part being adapted to cooperate with a second upper insert part.

By this arrangement, an insert is formed comprising three parts, in which the middle part is formed at one side as an upper insert part and at the opposite side, is formed with a part formed as a lower insert part. Each side of this middle insert part cooperates with an insert part as claimed.

The arrangement is a sort of sandwich insert comprising two injection channels, one placed in relation to the upper insert part and the other placed in relation to the lower insert part.

By integrated is to understand that the components in question are formed in one piece or they look as if they are formed in one piece, but are actually made in two. The contact surface between them is so tight that no injection material can be injected between the abutting surfaces during the moulding process.

In a further preferred embodiment of the invention, the injection channel is provided in the lower insert part and that the upper insert part is adapted, with its lower second surface, to cover the injection channel in a fluidtight manner, thereby closing the channel in its periphery.

In a further preferred embodiment of the invention, the lower second surface comprises the injection channel, said channel being in fluidtight connection with at least two side channels led away from each other.

In a further preferred embodiment of the invention, the upper insert part comprises at least two vertically placed channels, each comprising an inlet and an outlet, said vertical channels each being in fluid communication with a side channel, said outlet being placed at the upper first surface or at the lower first surface.

In a further preferred embodiment of the invention, the upper insert part is made in an elastic deformable material and in that the lower insert part is made in a material being harder and more wear-resistant than the material of the upper insert part.

The invention also concerns use of an insert according to the invention for performing a method according to the invention.

BRIEF DESCRIPTION OF THE DRAWINGS

The invention is explained in detail below with reference to the drawing(s), in which.

DETAILED DESCRIPTION OF THE INVENTION

Figure 1:
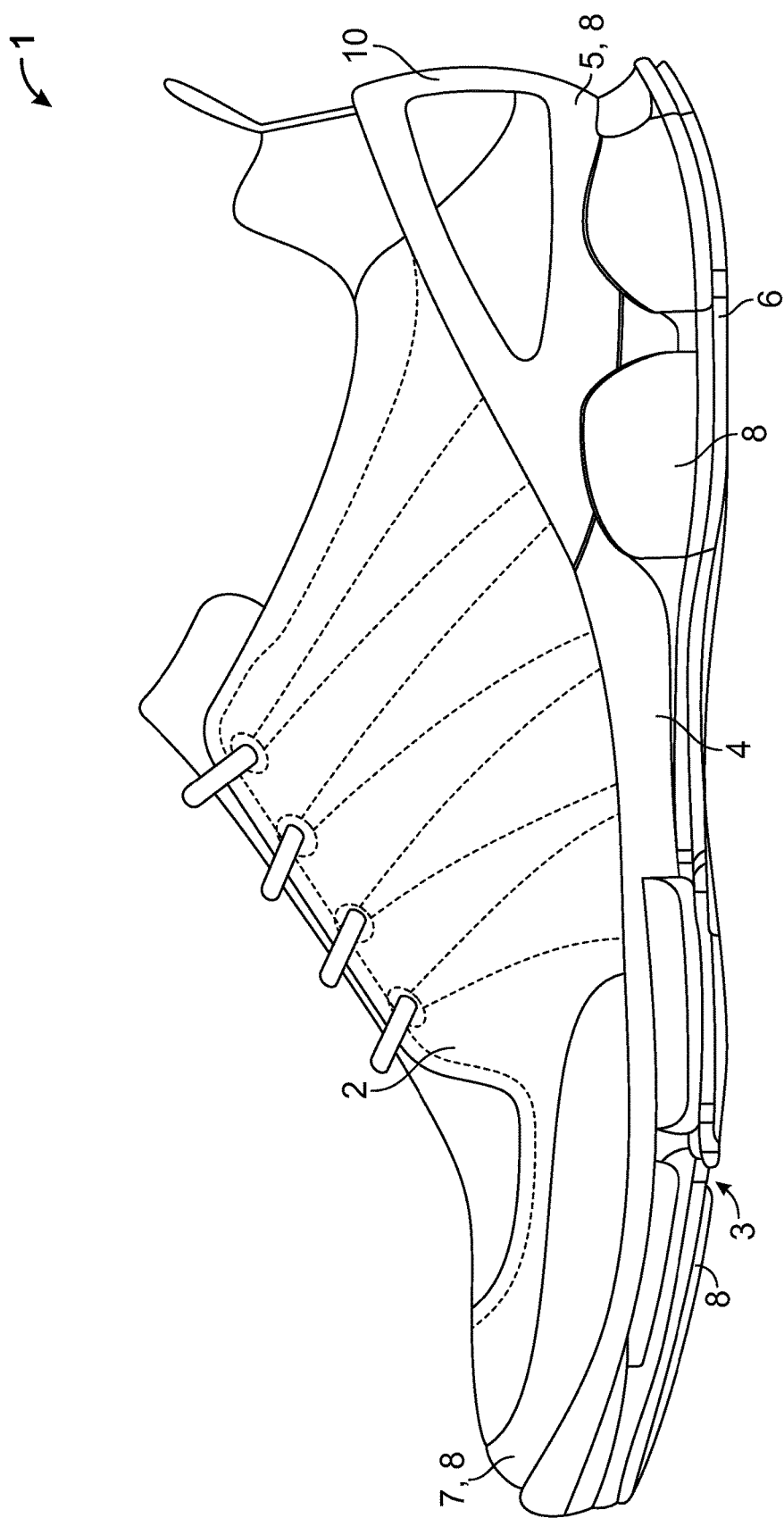
FIG. 1 shows a shoe comprising shoe parts manufactured according to the invention.

FIG. 1 shows a shoe 1 manufactured with shoe parts 8 using an insert and a method according to the invention. The shoe 1 is manufactured with a multi-density sole 3. In this embodiment, the sole 3 consist of a midsole 4, a heel cap 5, an outsole 6 and toe cap 7. The outsole is typically made in a TPU-material. In a heel portion 10, the heel cap 5 ensures a 180 degree firm grip around the heel. In order to ensure this firm grip, the heel cap 5 consists of polyurethane, which has a higher density than the polyurethane used for the midsole. Thus, instead of manufacturing the midsole 4 and heel cap 5 in only one polyurethane, different density polyurethanes or other materials are used for achieving different characteristics of the shoe in different places. Initially, the heel cap 5 is produced in a first manufacturing step and adheres to an upper 2, whereupon the heel cap 5 and midsole 4 are bound together in another step during an injection procedure. The toe cap 7 is produced by using an insert different from the insert used for producing the heel cap 5 and ensures that the toe area is protected by choosing a material with certain hardness. The outsole 6 comprises areas with well-defined shoe parts 8 produced according to the inventive method and using an insert according to the invention. The shoe parts 8 are produced in another material than the rest of the sole. This ensures mechanical properties suitable for that area in the shoe.

Figure 2:
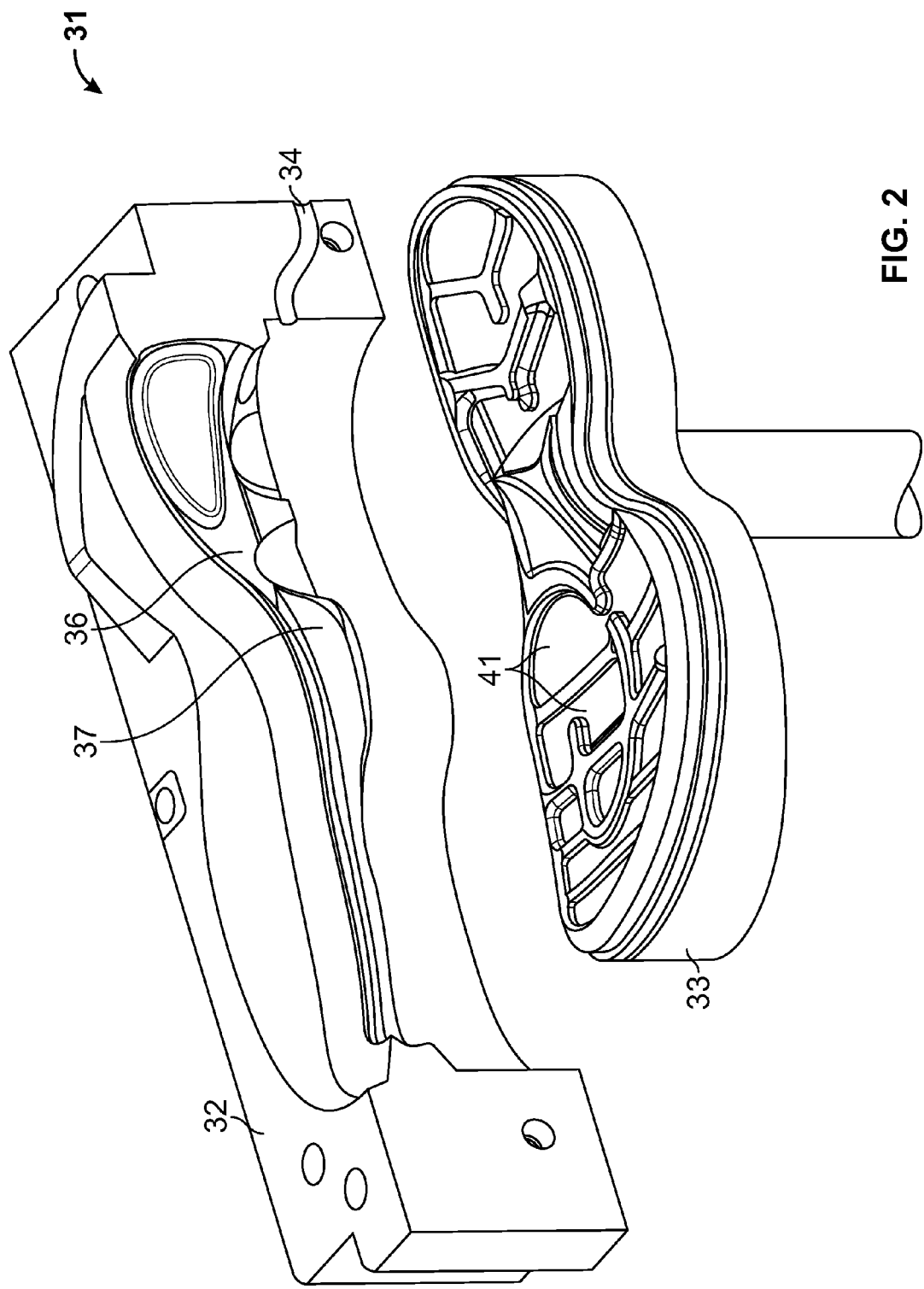
FIG. 2 is a view of one side frame of the mould and a bottom piston for producing a shoe comprising the shoe parts according to the invention.

FIG. 2 shows a mould 31 used for the method. The mould 31 consists in a known manner of side frames 32—only one side frame is shown, the other has similar proportions—and a bottom piston 33. The side frames can be moved horizontally and the bottom piston can be moved vertically. A last with a shoe upper will be placed above the top of the bottom piston 33, where after the side frame 32 will move horizontally towards the upper and finally abuts the upper. The injection of polyurethane is made through a sprue channel 34 placed in the mould and further through an injection channel 35 placed in the insert. The mould 31 defines an injection chamber, which is delimited by grooves 37 made in an aluminium wall of the side frame 32 and the corresponding side frame (not shown), and in this mould comprising a first cavity 36 and a treat pattern 41 formed on the top of the bottom piston 33 and a lasted upper lowered into the injection chamber. The injection chamber may comprise further cavities i.e. for producing a toe cap. The mould may also comprise several sprue channels.

Figure 3:
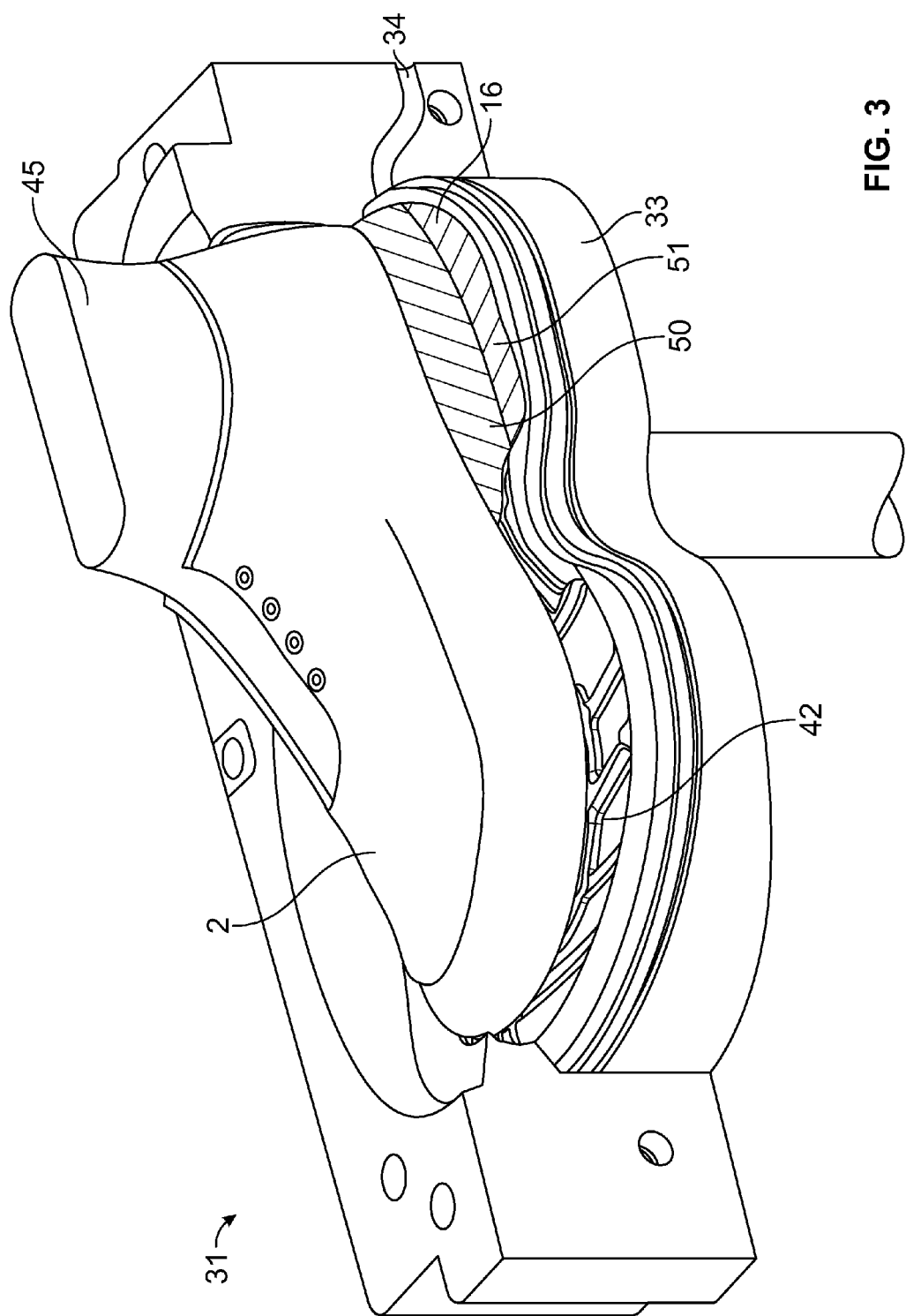
FIG. 3 shows a lasted upper and an insert placed in a mould as shown in FIG. 2.

FIG. 3 shows a lasted upper 2 and a shoe part shaping insert 16 placed in a mould 31. The upper 2 is lasted on a last 45 and roughened mechanically or by laser in selected regions of the upper 2 in order to obtain good adhesion of the sole and other parts to the upper. Then the shoe part shaping insert 16 is placed on top of the bottom piston 33. Placement of the insert 16 can be made simply by hand, semi-automatically or full-automatically. In this embodiment, the insert 16 is a replica of a finished sole in the heel area. The insert rests fixed on top of the bottom piston 33 and is precisely placed.

When placed on the bottom piston, the insert 16 delimits a first cavity 36, see FIG. 2, and a second cavity 42. The first cavity 36 corresponds in shape to the heel cap 5. The second cavity 42 includes a forefoot area of the sole. Both cavities are to be filed with polyurethane. The first cavity 36 is filled when the insert is in place in the mould. The second cavity is filled when the insert 16 has been removed.

When the insert 16 is placed, the lasted upper with shank, not shown in the drawings, mounted on the insole of the upper, is lowered into the mould and placed above the bottom piston 33 and on top of the insert 16. The two side frames of the mould are moved horizontally towards each other and abut the upper, where after the bottom piston 33 is elevated and seals the mould.

The entire body of the sole part shaping insert 16 is placed inside the injection chamber and is releasably mounted in the treat pattern of the bottom piston 33. The first injection with polyurethane is made through a sprue channel 34. The polyurethane will flow through an injection channel in the insert and inside the mould. The polyurethane will stay in the first cavity 36 and surround the U-shaped heel of the upper 2 to build a heel cap 5. After the first injection, the two side frames are moved horizontally away from the lasted upper, which now has a heel cap bonded to it and the lasted upper 2 is lifted from the mould. The insert 16 is removed from the upper by the operator and the sprue of the polyurethane heel cap is removed. The insert 16 comprises two parts; an upper insert part 50 and a lower insert part 51. The two parts are separated in order to remove the cured material in an injection channel placed in the interface of the two insert parts 51, 50. This first embodiment of this insert will be explained with reference to FIG. 4.

After the heel cap is formed and the insert is removed, the rest of the sole may be produced or further shoe parts may be produced using another shoe shaping insert and injecting a suitable material into the sprue channel 34.

Figure 4:
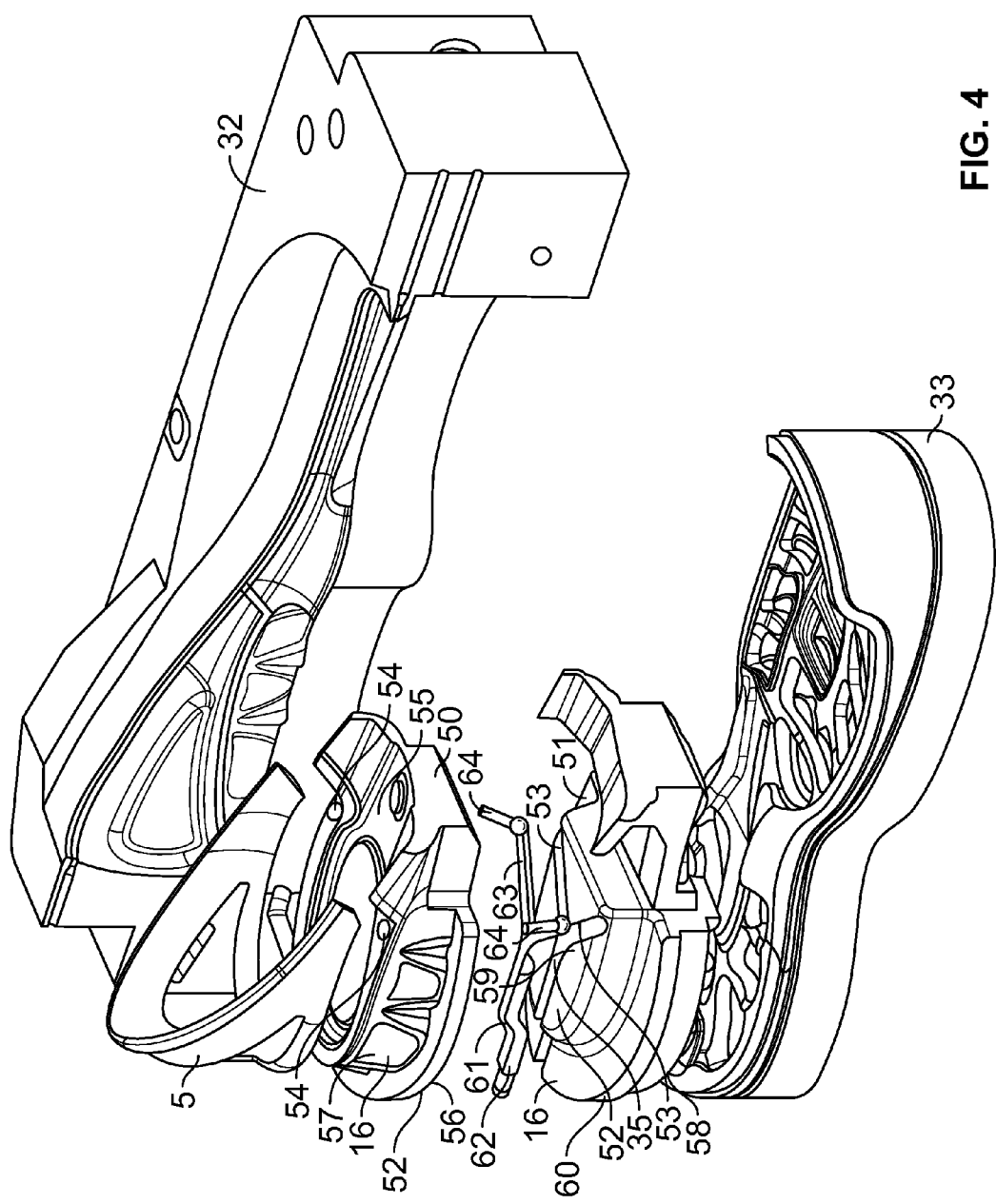
FIG. 4 shows a side frame, the bottom piston and a first embodiment of an insert according to the invention comprising an upper insert part and a lower insert part and for manufacturing a heel cap, which heel cap is also shown.

FIG. 4 shows the side frame 32, the bottom piston 33, a first embodiment of the insert 16 according to the invention comprising the upper insert part 50 and the lower insert part 51, by which insert a heel cap 5 is produced. The reference numbers cited for FIGS. 2 and 3 also applies for FIG. 4. The upper insert part 50 comprises an upper first surface 55, provided for turning towards the lasted upper and an oppositely placed upper second surface 56 and further an upper side surface 57 connecting the upper first 55 and second surfaces 56 with each other. The lower insert part 51 comprises a lower first surface 58 turning towards the inside of the mould, i.e. the bottom piston and an oppositely placed lower second surface 59 turning towards the upper second surface 56 and a lower side surface 60 connecting the lower first 58 and second 59 surfaces.

The upper first surface 55, the lower first surface 58 and the upper 57 and lower 60 side surfaces comprise the outer side of the insert 16.

The upper 56 and lower 59 second surfaces encircle at least one injection channel 35 when the two surfaces abut each other. The separation area 52 between the two parts is where the upper and lower 56, 59 second surfaces meet/abut each other. The insert part 16 is adapted to be separated, thereby exposing the injection channel 35. The lower parts 51 are preferably made in a hard and wear-resistant material such as glass fibre, aluminium or nylon. There may be more than one injection channel 35. In that case, the mould 31 will be provided with sprue channels 34, each being in fluid tight connection with a corresponding injection channel 35.

The upper part is made in a softer and more flexible material, such as a silicone or rubber. The separation area between the two parts 50, 51 must be fluidtight, which the material properties help to obtain.

FIG. 4 further shows a print of the whole injection path 61. The print comprises: print 62 of the injection channel 35 placed in the insert 16, print of two side channels 63 and of two vertical parts 64 of the side channels 63. The injection channel 35 is placed in the lower insert part 51 and continues being fluidtight in two side channels 53 pointing away from each other. The two side channels are further formed vertically—as implicitly disclosed by the print of the injection path 61—each ending in an outlet 54 placed at the upper first surface 55. The melt will then flow into the cavity as explained with reference to FIG. 2 and FIG. 3. By this arrangement the heel cap 5 is formed, which is also shown in FIG. 4. The melt is flowing into the heel cap cavity from two oppositely placed sides and run together in the middle plan of the heel.

Due to the inlets 54 being placed at the bottom surface of the heel cap, there will be no visible injection impressions. The two impressions will be covered by a midsole produced afterwards. After the mould is opened, the insert 16 is opened into the two halves 50, 51 and the cured injection path 61 made of the polyurethane material or similar material for the heel cap is removed. Then a new insert 16 can be placed, this will be explained with reference to FIG. 5 or 6, or an injection takes place in order to fill in the whole cavity left when the cap insert is removed, thereby producing the final sole. An outer sole may be placed at the bottom piston before the material for providing the midsole is injected. The injection chamber now corresponds to the full midsole 4 of the shoe and a second injection with polyurethane different from the first polyurethane is made through the sprue channel 34. The midsole material will then cover the impression scars in the heel cap 5 made after this has been produced and as explained above.

In this embodiment, the first injection is made on an upper heel portion 10, where the insert 16 has delimited a first cavity 36 producing the heel cap 5 and the second injection produces the rest of the sole.

Figure 5:
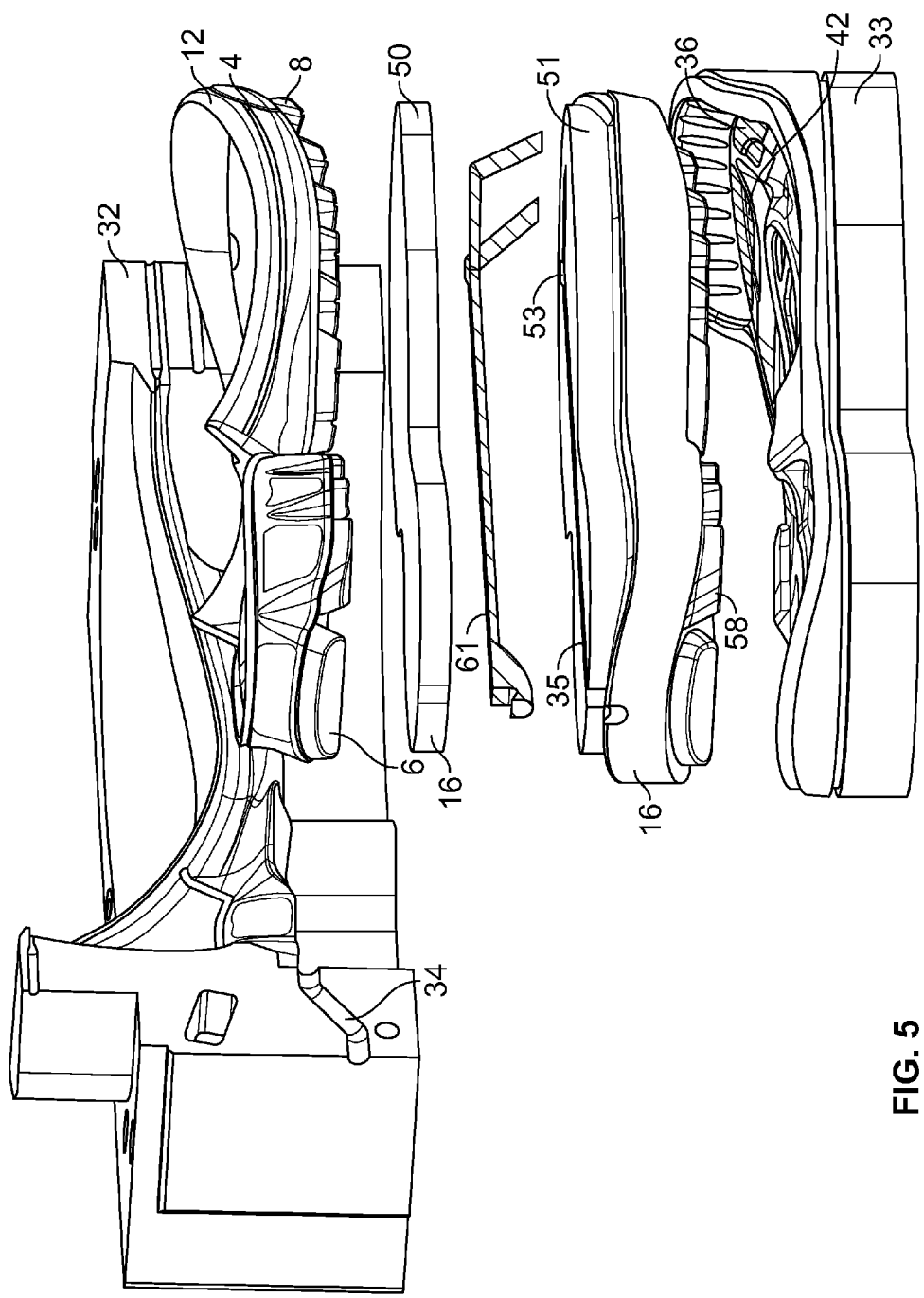
FIG. 5 shows a side frame and a bottom piston, a second embodiment of an insert according to the invention and a sole comprising the shoe parts manufactured by using a second insert embodiment.

FIG. 5 shows a second embodiment of the insert 16 according to the invention; the insert 16 may follow after the heel cap as shown in FIG. 4 has been produced or it may be the first insert placed in order to produce parts of the sole. A segmented more density sole 12 can be made by injecting polyurethane through the injection channel 35. The cavity 36 comprises two separate areas each communicating with a side channel 53 of the insert 16. The channels 53 of the insert are made in the surface of the lower insert part 51 and comprise horizontally and vertically oriented channel parts. The upper insert part 50 covers the injection channel 35 placed in the lower insert part 51. The drawing also shows the print 61 of the whole injection path. The insert comprises two side channels directed vertically downwards having their outlets at the lower first surface 58 of the lower insert part 51. The melt is directed into the cavity 36, placed in the bottom piston 33 and delimited by the lower first surface 58 and the bottom piston 33. The drawing also shows the principle of the last produced sole 12 comprising shoe parts 8 formed by the cavities and being a part of the outsole 6. The rest of the sole is provided by injecting the material into a second cavity 42 formed when the insert is removed.

Figure 6:
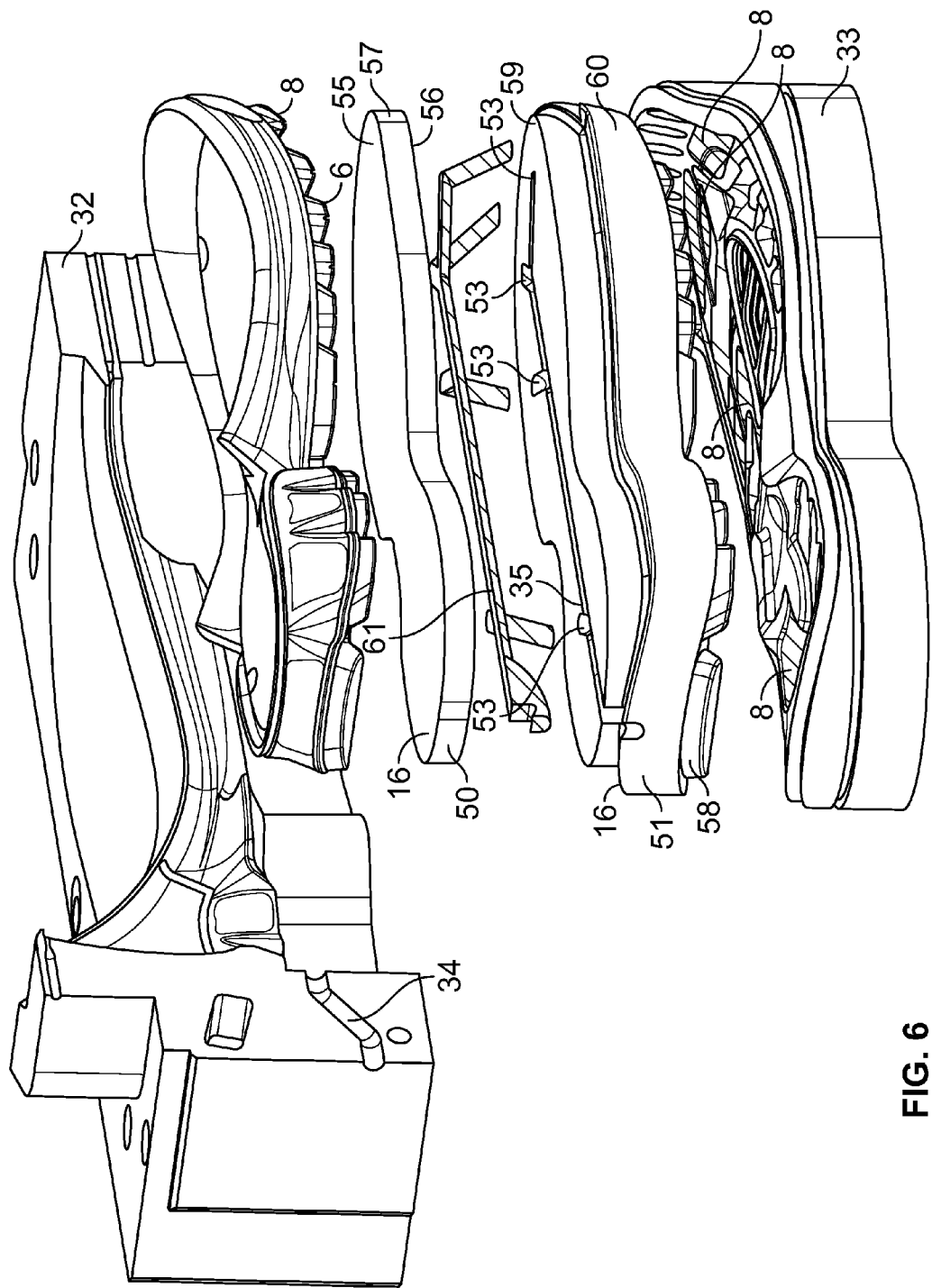
FIG. 6 shows a side frame and a bottom piston, a third embodiment of an insert according to the invention and a sole comprising shoe parts manufactured with the use of the third embodiment.

FIG. 6 shows a third embodiment of an insert 16 according to the invention comprising an injection channel 35 and several side channels 53. Four side channels 53 are shown in this example; however, it could be more. The side channels 53 can also point upwards and not only downwards. In case the side channels are pointing upwards, they will of course run through the upper insert part 50. However, in this example the side channel 53 open up at the lower first surface 58 of the lower insert part 51. Thereby, the melt is injected into the cavity providing four shoe parts 8. The drawing also shows a print 61 of the cured melt in the injection path and the final produced sole 12 comprising the shoe parts 8. The shoe parts are specific parts of the outsole 6 having other mechanical properties than the rest of the outsole 6.

However, the removed insert 16 could be exchanged with another insert 16, whereby a new specific cavity is provided into which a material is injected. Thereby, another shoe part(s) 8 is/are formed. When several inserts 16 are used during the injections, the shoe part shaping inserts 16 are partitioning the injection chamber into at least a first 36, a second 42 and a third cavity, where a first shoe part material of a given colour or density or other given mechanical properties is injected into the first cavity 36 through the injection channel 35 of the first insert. After removal of the first shoe part shaping insert 16, the second shoe part shaping insert 16 comprising a second injection channel 35 is placed in the mould 31, and a second material with different mechanical properties is injected through the second channel into the second cavity 42 made by removal of the first shoe part shaping insert 16. The third cavity is created by removing the second insert 16. The injected material is injected through the sprue channel(s) 34 of the mould 31.

Figure 7:
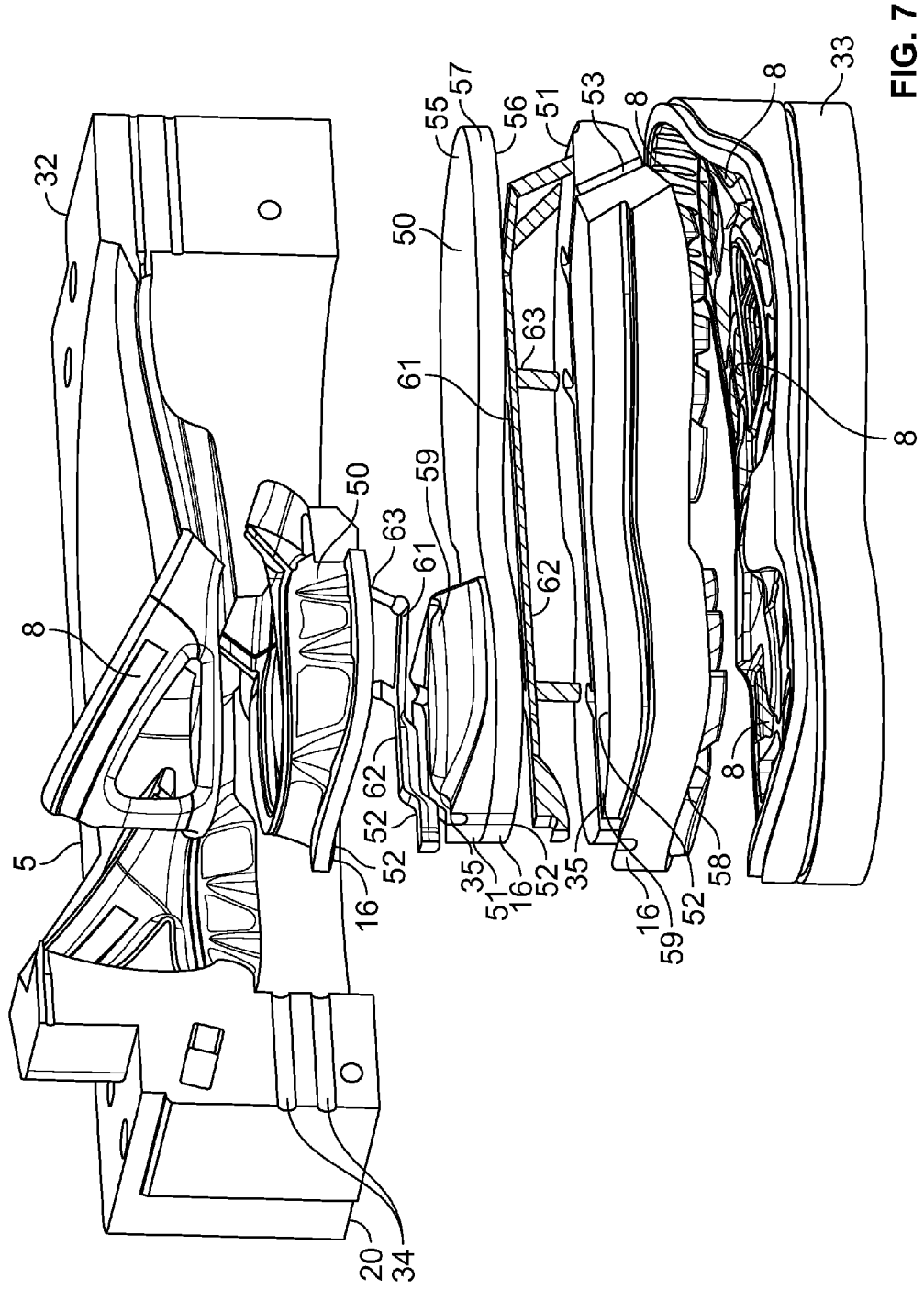
FIG. 7 shows a side frame and a bottom piston, a fourth embodiment of an insert according to the invention, and shoe parts manufactured with the use of the fourth embodiment.

FIG. 7 shows a fourth embodiment of an insert according to the invention and shoe parts manufactured with the use of the fourth embodiment. The principal difference between this embodiment and the embodiments one to three is that the insert comprises more than two insert parts: it comprises three. The insert is actually build up by using the insert known from embodiment three and the insert known from embodiment one. At the upper first surface 55, the lower insert part shown in embodiment one is attached to the insert known from embodiment three has at the upper first surface 55 attached the lower insert part shown in embodiment one. This means, that the upper insert part from embodiment three and the lower insert part from embodiment one are formed as an integrated part, while the upper insert part known from embodiment one and the lower insert part known from embodiment three are both unchanged.

By this arrangement, it is necessary to provide two sprue channels 34 in the mould. Each sprue channel is in fluidtight connection with an injection channel 35. The two injection channels 35 are placed in the same manner as in embodiments one and three. However, even more injection channels and sprue channels could be provided.

Then, the material is injected through each of the sprue channels leading to the cavities and thereby forming the shoe parts 8. A first shoe part material of a given colour, density or given mechanical properties is injected into the first cavity 36 through the injection channel 35 placed in one of the insert parts, and a second material is injected through another sprue channel in fluidtight connection with the other injection channel placed in the other insert part and flowing further into the second cavity. Thereby, different shoe parts are formed. By a cavity is to understand one or more specific areas, where the injected material arising from one injection channel is forming shoe parts. Finally, the insert is removed and the final injection takes place through one of the sprue channels forming the rest of the sole.

The shoe described above comprises several plastic material with different density and different other mechanical properties. This could be three, four or five, depending on the number of inserts used for producing such a shoe. The different inserts may be defined in different ways and may in this way produce shoes having specific parts with specific shoe part elements and having different mechanical properties, different colours and different designs.

LIST OF REFERENCES 1 shoe
2 upper
3 multi-density sole
4 midsole
5 heel cap
6 out sole
7 toe cap
8 shoe part
10 heel portion upper
12 sole
16 shoe part shaping insert
31 mould
32 side frames
33 bottom piston
34 sprue channel
35 injection channel
36 first cavity
37 grooves
41 tree pattern
42 second cavity
45 last
50 upper insert part
51 lower insert part
52 separation area
53 side channel
54 outlet for side channel
55 upper first surface
56 upper second surface
57 upper side surface
58 lower first surface
59 lower second surface
60 lower side surface
61 cured TPU print of the whole injection path
62 print of injection channel
63 print of side channel
64 print of side channel vertical portion

The invention claimed is:

1. A shoe part shaping insert (16) adapted to be placed in a mould and for shaping a shoe part (8), characterised in that the insert (16) comprises at least an upper insert part (50) and a lower insert part (51), said upper part (50) comprising an upper first sur-face (55) facing a lasted upper and an oppositely placed upper second surface (56), said upper part further comprising an upper side surface (57) connecting the first and second surfaces (55,56) of the upper part (50) with each other, and the lower insert part (51) comprising a lower first surface (58) facing the inside of the mould (31) and an oppositely placed lower second surface (59) facing the upper second surface (56) and a lower side surface (60) connecting the lower first and second surfaces (58, 59), said upper and lower second surfaces (56, 59) encircling at least one injection channel (35) when the two surfaces abut each other and the insert part (16) being adapted to be separated, thereby exposing the injection channel (35).

2. A shoe part shaping insert (16) according to claim 1, characterised in that it comprises at least one further insert part (50), said insert part being provided to be placed with a surface facing the upper first surface (55), and an injection channel being provided between the two surfaces, when the two surfaces abut each other.

3. A shoe part shaping insert (16) according to claim 1, characterised in that it comprises at least one further insert part, said insert part being provided to be placed with a surface facing the lower first surface (58), and an injection channel being provided between the two surfaces, when the two surfaces abut each other.

4. A shoe part shaping insert (16) according to claim 1, characterised in that an upper insert part adapted to cooperate with a lower insert part is further provided with a second lower insert part placed at and integrated with the upper first surface of the upper insert part, said second lower insert part being adapted to cooperate with a second upper insert part.

5. A shoe part shaping insert according to claim 1, characterised in that the injection channel (35) is provided in the lower insert part (51) and that the upper insert part (50) is adapted, with its lower second surface (59), to cover the injection channel (35) in a fluidtight manner, thereby closing the channel in its periphery.

6. Insert according to claim 1, characterised in that the lower second surface (59) comprises an injection channel (35), said channel being in fluidtight connection with at least two side channels led away from each other.

7. Insert according to claim 1, characterised in that the upper insert part (50) comprises at least two vertically placed channels, each comprising an inlet and an outlet, said vertical channels each being in fluid communication with a side channel (53), said outlet being placed at the upper first surface (55) or at the lower first surface (58).

8. Insert according to claim 1, characterised in that the upper insert part (50) is made in an elastic deformable material and in that the lower insert part (51) is made in a material being harder and more wear-resistant than the material of the upper insert part (50).

* * * * *